United States Patent [19]
Chou

[11] Patent Number: 6,059,200
[45] Date of Patent: May 9, 2000

[54] WATER FLOW RATE CONTROL DEVICE WITH A PRESSURE RELIEF DEVICE

[76] Inventor: Hsiao-Tsung Chou, 4-2 FL, No. 2, 43 Lane, Chung-Hwa Rd., Sanhsia Town, Taipei Hsien, Taiwan

[21] Appl. No.: 09/131,330

[22] Filed: Aug. 7, 1998

[51] Int. Cl.⁷ ......................................................... B05B 9/00
[52] U.S. Cl. .......................... 239/124; 239/126; 239/569; 239/583; 4/675
[58] Field of Search ..................... 239/124, 126, 239/525, 530, 571, 583, 569; 4/597, 605, 615; 137/455, 115.28

[56] References Cited

U.S. PATENT DOCUMENTS

| | | | |
|---|---|---|---|
| 871,321 | 11/1907 | Cassel | 239/126 |
| 1,256,600 | 2/1918 | Schossow. | |
| 3,589,610 | 6/1971 | Wahlin et al. | 239/583 |
| 4,161,965 | 7/1979 | Merritt | 4/675 |
| 4,573,639 | 3/1986 | Logue | 239/569 |

*Primary Examiner*—Steven O. Douglas
*Assistant Examiner*—Khoa Huyhn
*Attorney, Agent, or Firm*—Bacon & Thomas, PLLC

[57] ABSTRACT

A water flow rate control device includes a water output device connected to a water supply source for output of water through a water passage defined therein. A water flow rate control unit is mounted in the water output device and configured to close/open the water passage of the water output device and to regulate the water flow rate passing through the water passage of the water output device. A control switch is operated to drive the water flow rate control unit, causing the water flow rate control unit to close/open the water passage of the water output device. A pressure relief control unit includes a spring supported relief valve mounted in the water output device and coupled to the water flow rate control unit to automatically release a high pressure when the water flow rate control unit is driven to close the water passage of the water output device.

8 Claims, 6 Drawing Sheets

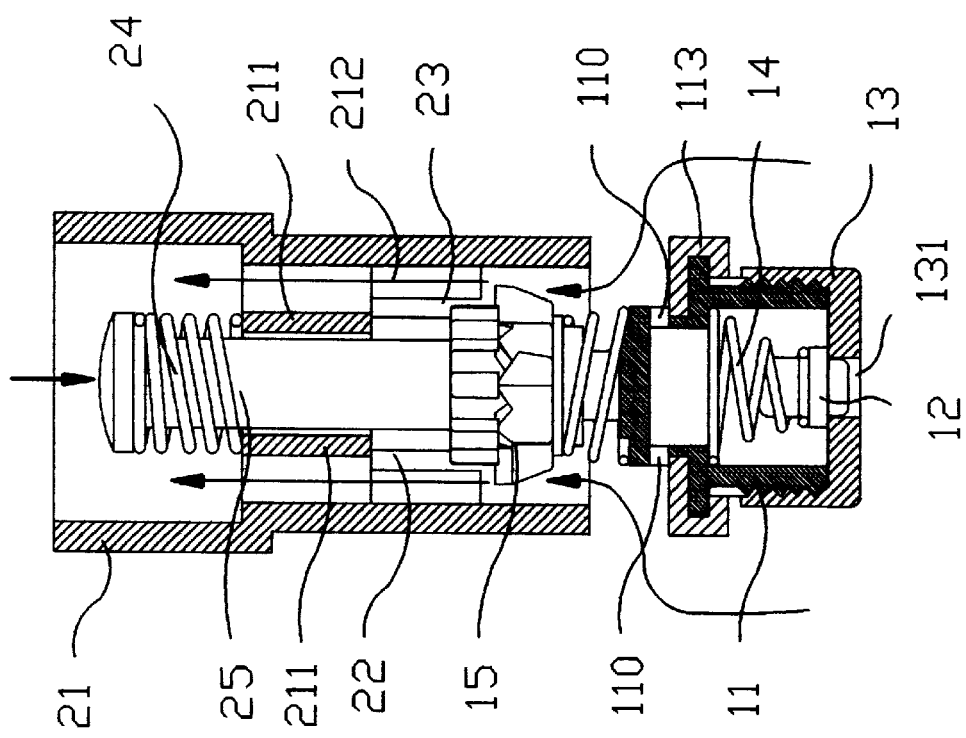
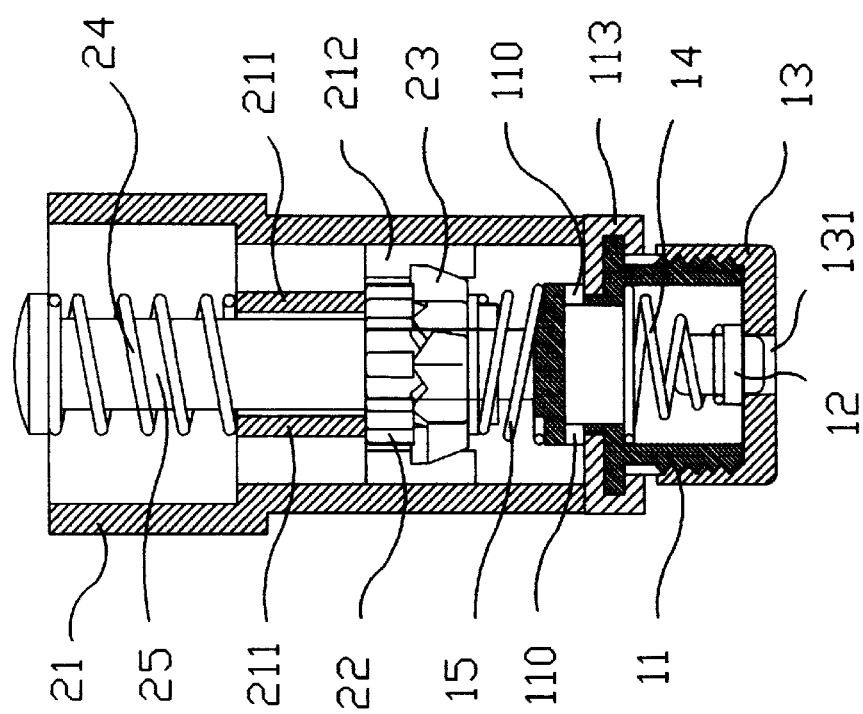
Fig.3A
Fig.3B

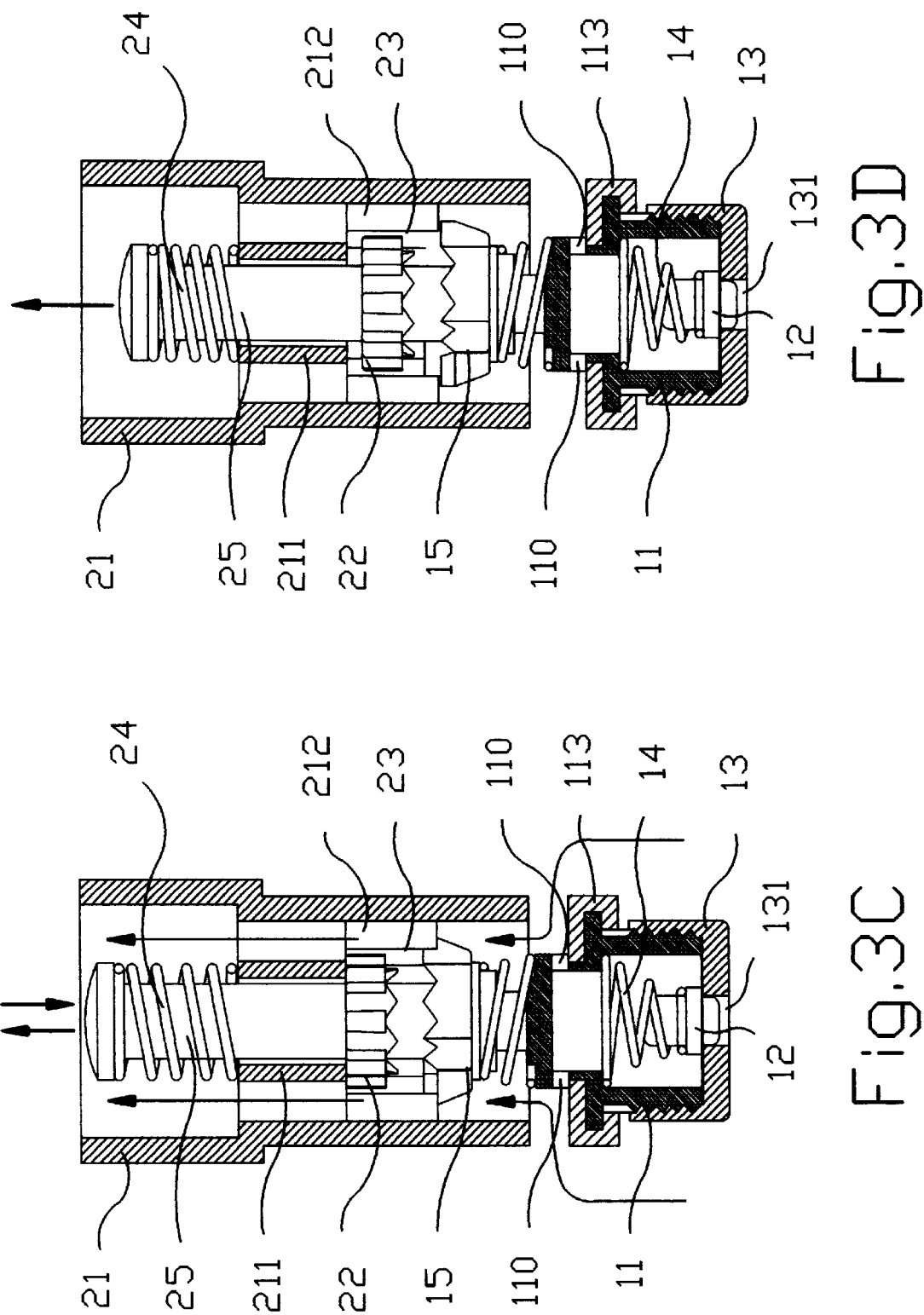

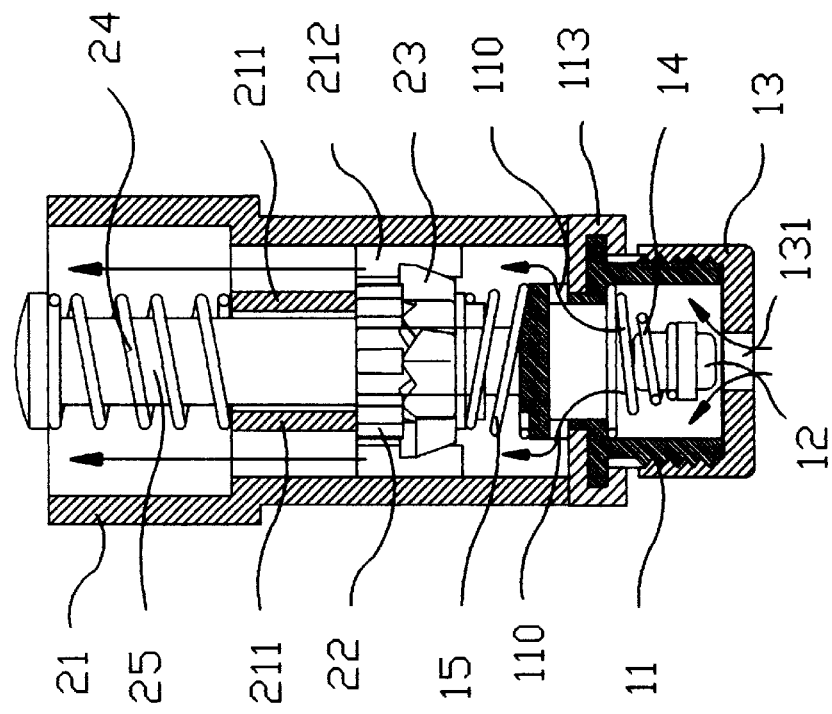

6,059,200

WATER FLOW RATE CONTROL DEVICE WITH A PRESSURE RELIEF DEVICE

BACKGROUND OF THE INVENTION

1. Field of the Invention

The present invention relates to a water flow rate control device, and more particularly to such a water flow rate control device which has a pressure relief device that automatically releases a sudden rise in high pressure when the water passage is suddenly closed.

2. Description of Related Art

In regular water supply systems for high-rise buildings, the diameter of the water outlet pipes is relatively smaller than that of the main water delivery pipe. In order to release excessive high pressure from the water outlet pipes or the main water delivery pipe, relief valve means may be installed. However, because the relief valve device is installed at a location far away from the water output device (for example, a shower) at the end of each water outlet pipe, the relief valve device cannot release a sudden rise in high pressure from the water output device or the connecting area between the water output device and the respective water outlet pipe when the water output device is suddenly shut off. When the water output device is suddenly shut off, a sudden high pressure will be produced, causing the shell of the water output device or the connecting area between the water outlet pipe and the water output device to be broken.

SUMMARY OF THE INVENTION

The present invention has been accomplished to provide a water flow rate control device which eliminates the aforesaid problem. According to one aspect of the present invention, the water flow rate control device comprises a water flow rate control unit installed in a water output device, for example, a shower, and controlled by a control switch to close/open the water passage of the water output device, and a pressure relief control unit which automatically releases excessive high pressure when the water flow rate control device is suddenly closed to stop water from passing out of the water output device. According to another aspect of the present invention, the water flow rate control device can be rotated to regulate the flow rate of water passing out of the water output device.

BRIEF DESCRIPTION OF THE DRAWINGS

FIG. 3A is a sectional view of the present invention, showing the operation of the water flow rate control device (I).

FIG. 3B is a sectional view of the present invention, showing the operation of the water flow rate control device (II).

FIG. 3C is a sectional view of the present invention, showing the operation of the water flow rate control device (III).

FIG. 3D is a sectional view of the present invention, showing the operation of the water flow rate control device (IV).

FIG. 3E is a sectional view of the present invention, showing the operation of the water flow rate control device (V).

DETAILED DESCRIPTION OF THE PREFERRED EMBODIMENT

Figure 1:
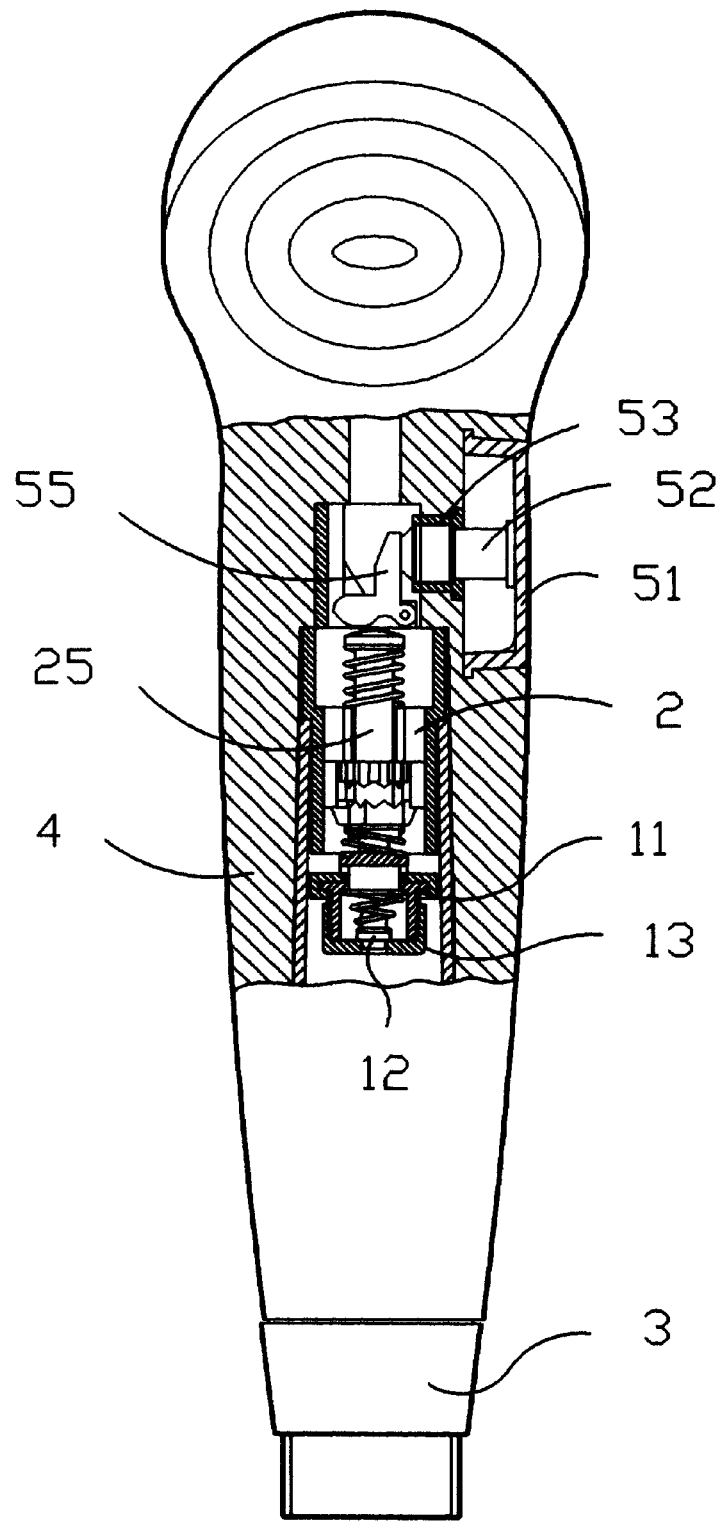
FIG. 1 is a partial sectional view of a water flow rate control device according to the preferred embodiment of the present invention.
Figure 2:
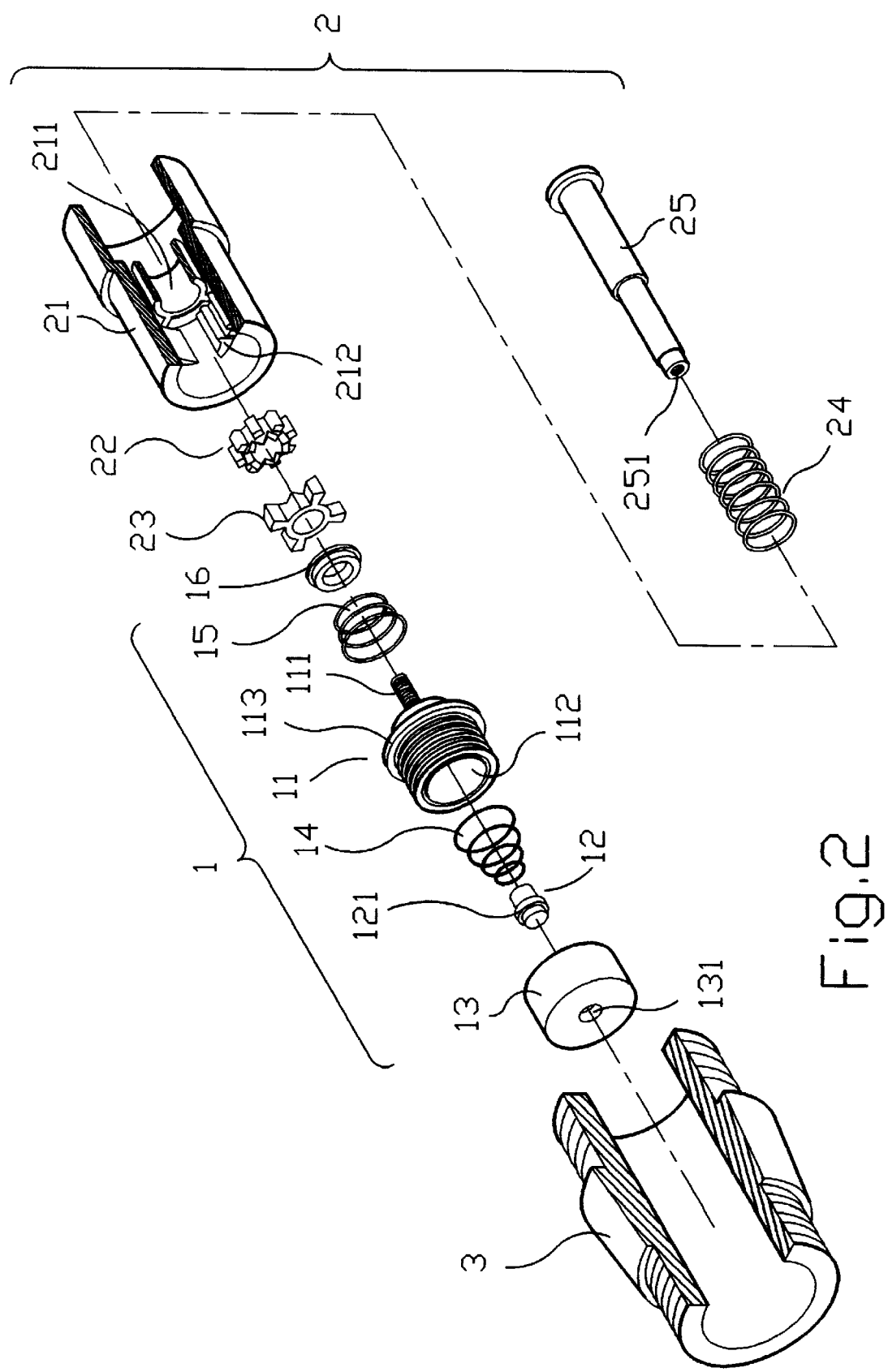
FIG. 2 is an exploded view of the water flow rate control unit and the pressure relief control unit of the water flow rate control device according to the present invention.

Referring to FIGS. 1 and 2, a water flow rate control device in accordance with the present invention is generally comprised of a pressure relief control unit 1, a water flow rate control unit 2, a pipe connector 3, a water output device 4, and a control switch 5. The pressure relief control unit 1 and the water flow rate control unit 2 are connected together and mounted in the water output device 4. The pipe connector 3 is fastened to the water output device 4 at one end for connection to a water supply pipe (not shown). The control switch 5 is mounted in the water output device 4 at one side, and operated to control the operation of the pressure relief control unit 1 and the water flow rate control unit 2. According to the present preferred embodiment, the water output device 4 is a shower.

Figure 4:
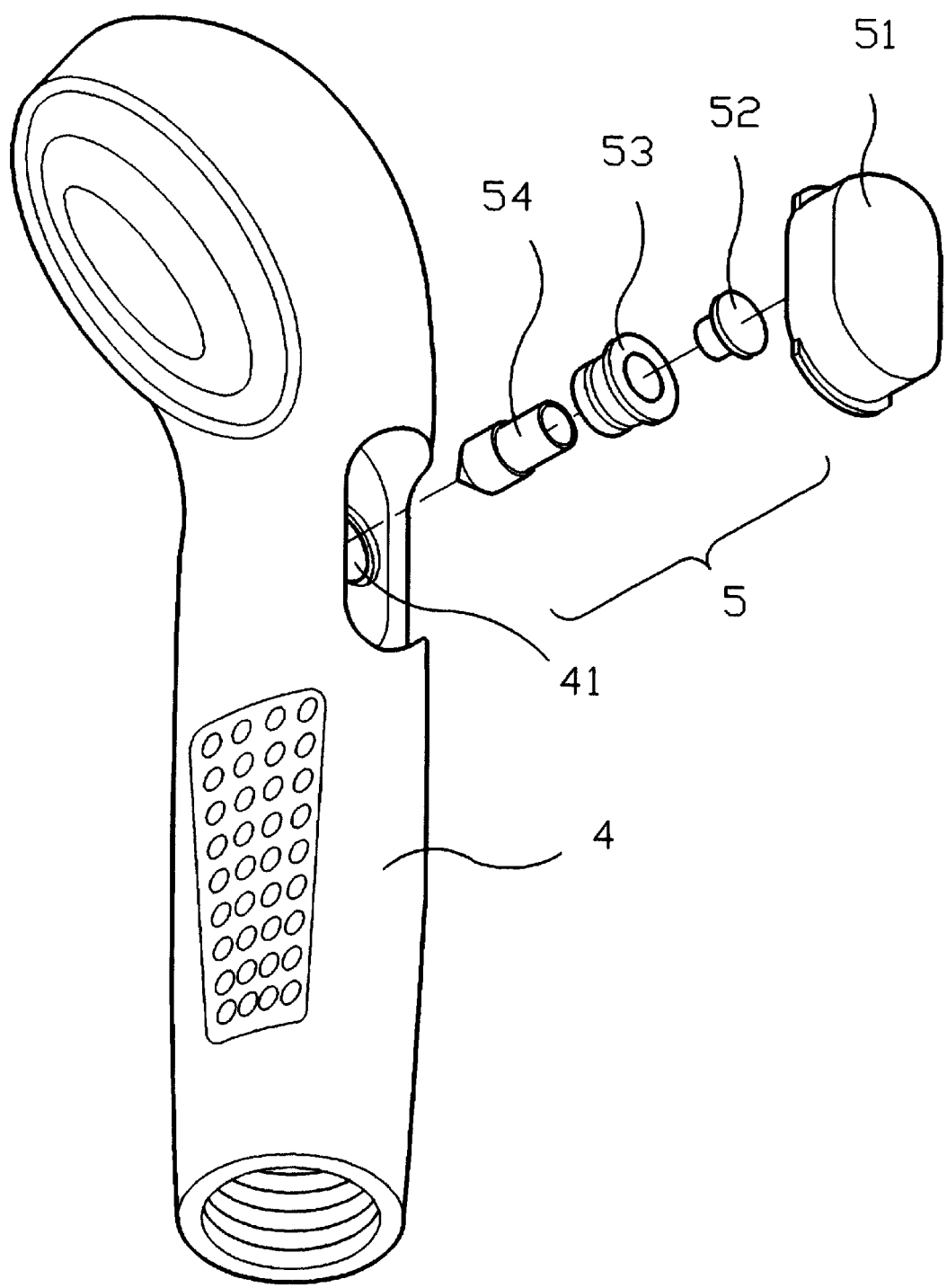
FIG. 4 is an exploded view of the control switch according to the present invention.

The pressure relief control unit 1 is comprised of a valve block 11, a relief valve 12, a cap 13, a first spring member 14, a second spring member 15, and a gasket 16. The valve block 11 comprises a receiving chamber 112 at one end, a screw rod 111 at an opposite end in communication with the receiving chamber 112, a flexible packing ring 113 mounted around the periphery between the receiving chamber 112 and the screw rod 111, and a plurality of relief outlets 110 spaced around the periphery and disposed in communication between the receiving chamber 112 and the inside space of the screw rod 111. The first spring member 14 is mounted within the receiving chamber 112 of the valve block 11. The relief valve 12 is supported on the first spring member 14, having a collar 121 raised around the periphery. The cap 13 is covered on the valve block 11 to hold the relief valve 12 and the first spring member 14 inside the receiving chamber 112, having a water inlet 131 at the center. The first spring member 14 imparts a forward pressure to the relief valve 12, causing the relief valve 12 to engage into the water inlet 131 at the cap 13. When the relief valve 12 is forced into the water inlet 131, the collar 121 of the relief valve 12 is stopped at an inside wall of the cap 13 behind the water inlet 131, and therefore the water inlet 131 is closed. The second spring member 15 is mounted around the screw rod 111 and stopped against the water flow rate control unit 2 to impart a forward pressure to the valve block 11. The gasket ring 16 is mounted around the screw rod 111 and stopped between the water flow rate control unit 2 and the second spring member 15. The water flow rate control unit 2 is comprised of a cylindrical shell 21, a guide gear 22, a positioning gear 23, a compression spring 24, and a headed push rod 25. The cylindrical shell 21 comprises an axle bearing 211 and a toothed portion 212 longitudinally aligned on the inside. The headed push rod 25 is inserted through the shell 21 and supported in the axle bearing 211, having a longitudinally extended front screw hole 251 threaded onto the screw rod 111. The guide gear 22 and the positioning gear 23 are longitudinally slidably mounted around the headed push rod 25, and forced into engagement with the toothed portion 212. The positioning gear 23 is mounted around the headed push rod 25 within the shell 21, and retained between the guide gear 22 and the gasket 16 of the water pressure control unit 1. The guide gear 22 is mounted around the headed push rod 25 within the shell 21, and disposed between the positioning gear 23 and the axle bearing 211. The compression spring 24 is mounted around the headed push rod 25 within the shell 21, and stopped between the head of the headed push rod 25 and the axle bearing 211. The control switch 5 is mounted in a side hole 41 at one side of the water output device 4, comprised of a push button 51, a coupling element 52, a gasket ring 53, a driving rod 54, and an actuating element 55 (see also FIG. 4). The coupling element 52 is coupled between the push button 51 and the driving rod 54. The gasket ring 53 is mounted around the driving rod 54 and the coupling element 52 to seal the side hole 41 in the water output device 4. The actuating element 55 is connected between the driving rod 54 and the headed push rod 25 of the water flow rate control unit 2.

Referring to FIGS. from 3A through 3E and FIGS. 1 and 4 again, when the push button 51 of the control switch 5 is depressed, the actuating element 55 is driven by the driving rod 54 to push the headed push rod 25 forwards, causing the valve block 11 to be moved forwardly away from the front end of the shell 21, enabling water to flow into the shell 21 and then out of the water output device 4, and at the same time the positioning gear 23 is forced into engagement with the toothed portion 212 to hold the water flow rate control unit 2 in the opened position (see FIGS. from 3A through 3C). By rotating the headed push rod 25 forwards/backwards on the screw rod 111, the spring force of the second spring member 15 is relatively adjusted, and therefore the water flow rate is relatively regulated. When the push button 51 of the control switch 5 is depressed again, the positioning gear 22 is disengaged from the toothed portion 212, and the valve block 11 is moved from the position shown in FIG. 3C through the position shown in FIG. 3D to the position shown in FIG. 3D to close the front end of the shell 21 (i.e., to close the water passage), and therefore water is stopped from passing out of the water output device 4. When the water passage (the shell 21) is suddenly closed, a sudden high water pressure is produced to push the relief valve 12 backwards, enabling water to flow through the water inlet 131 to the inside of the shell 21, and therefore the sudden high water pressure is released (seed FIG. 3E). When the sudden high water pressure is released, the relief valve 12 is forced forwards by the first spring member 14 to close the water inlet 121 again (see FIG. 3A).

While only one embodiment of the present invention has been shown and described, it will be understood that various modifications and changes could be made thereunto without departing from the spirit and scope of the invention disclosed.

What the invention claimed is:

1. A water flow rate control device comprising: a water output device connected to a water supply source and configured to output water through a water passage defined therein; a water flow rate control unit mounted in said water output device configured to close/open the water passage of said water output device and to regulate the water flow rate passing through the water passage of said water output device; a control switch configured to drive said water flow rate control unit to close/open the water passage of said water output device; and a pressure relief control unit mounted in said water output device and coupled to said water flow rate control unit and configured to release high water pressure when said water flow rate control unit is driven to close the water passage of said water output device; and said pressure relief control unit comprised of a valve block driven by said water flow rate control unit to close/open the water passage of said water output device, a cap covered on said valve block, a first spring member mounted in said valve block, a relief valve mounted in said valve block and forced forwards by said first spring member to stop water from passing to the inside of said water flow rate control unit, a gasket sealed between said valve block and said water flow rate control unit, and a second spring member connected between said valve block and said gasket to force said valve block forwards from said water flow rate control unit.

2. The water flow rate control device of claim 1 wherein said relief valve is a peripherally flanged shaft.

3. A water flow rate control device comprising: a water output device connected to a water supply source and configured to output water through a water passage defined therein; a water flow rate control unit mounted in said water output device configured to close/open the water passage of said water output device and to regulate the water flow rate passing through the water passage of said water output device; a control switch configured to drive said water flow rate control unit to close/open the water passage of said water output device; and a pressure relief control unit mounted in said water output device and coupled to said water flow rate control unit and configured to release high water pressure when said water flow rate control unit is driven to close the water passage of said water output device; and said valve block comprises a screw rod axially extended from a rear side thereof and coupled to said water flow rate control unit, a flexible packing ring mounted around the periphery, a front receiving chamber, which receives said relief valve, and a plurality of relief outlets.

4. The water flow rate control device of claim 1 wherein said relief valve comprises a collar.

5. The water flow rate control device of claim 1 wherein said cap of said pressure release control unit has a water inlet closed by said relief valve.

6. The water flow rate control device of claim 1 wherein said water flow rate control unit comprises a shell, a headed push rod inserted through said shell and coupled to the valve block of said pressure relief control unit by a screw joint, a spring device, which imparts a backward pressure to said headed push rod, causing said valve block of said pressure relief control unit to be moved with said headed push rod backwards in closing the water passage of said water output device, a guide gear device which guides the movement of said headed push rod in said shell in an axial direction, and positioning gear means, which holds said headed push rod in position when said headed push rod is driven by said control switch to open the water passage of said water output device.

7. The water flow rate control device of claim 6 wherein said shell of said water flow rate control unit comprises an axle bearing, which supports said headed push rod in said shell, and a toothed portion raised around an inside wall thereof for engagement with said positioning gear means.

8. A water flow rate control device comprising: a water output device connected to a water supply source and configured to output water through a water passage defined therein; a water flow rate control unit mounted in said water output device configured to close/open the water passage of said water output device and to regulate the water flow rate passing through the water passage of said water output device; a control switch configured to drive said water flow rate control unit to close/open the water passage of said water output device; and a pressure relief control unit mounted in said water output device and coupled to said water flow rate control unit and configured to release high water pressure when said water flow rate control unit is driven to close the water passage of said water output device; and said control switch comprises a push button, a driving rod, a coupling element coupled between said push button and said driving rod, a gasket ring mounted around said driving rod and said coupling element, and an actuating element connected between said driving rod and said water flow rate control unit.

* * * * *